United States Patent
Tsai et al.

(10) Patent No.: US 9,246,889 B2
(45) Date of Patent: Jan. 26, 2016

(54) LAYERED PROTECTION AND VALIDATION OF IDENTITY DATA DELIVERED ONLINE VIA MULTIPLE INTERMEDIATE CLIENTS

(75) Inventors: Chia Ling Tsai, San Diego, CA (US); Alexander Medvinsky, San Diego, CA (US); Xin Qiu, San Diego, CA (US); Kyle W. Stewart, San Diego, CA (US); Fan Wang, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 759 days.

(21) Appl. No.: 12/854,925

(22) Filed: Aug. 12, 2010

(65) Prior Publication Data
US 2011/0213957 A1 Sep. 1, 2011

Related U.S. Application Data

(60) Provisional application No. 61/233,338, filed on Aug. 12, 2009.

(51) Int. Cl.
| | | |
|---|---|---|
| H04L 29/06 | (2006.01) | |
| H04L 9/00 | (2006.01) | |
| H04L 9/08 | (2006.01) | |
| H04L 9/32 | (2006.01) | |
| G06F 21/62 | (2013.01) | |
| G06F 21/64 | (2013.01) | |

(52) U.S. Cl.
CPC .......... *H04L 63/045* (2013.01); *G06F 21/6218* (2013.01); *G06F 21/64* (2013.01); *H04L 9/006* (2013.01); *H04L 9/0825* (2013.01); *H04L 9/3234* (2013.01); *H04L 9/3265* (2013.01); *H04L 63/062* (2013.01); *H04L 63/0823* (2013.01); *H04L 63/123* (2013.01); *H04L 2463/062* (2013.01)

(58) Field of Classification Search
CPC ...... H04L 9/006; H04L 9/0825; H04L 9/3263
USPC .......................................................... 713/153
See application file for complete search history.

(56) References Cited

U.S. PATENT DOCUMENTS

| | | | |
|---|---|---|---|
| 6,324,645 B1 | 11/2001 | Andrews et al. | |
| 6,427,149 B1 * | 7/2002 | Rodriguez et al. | 709/219 |
| 6,564,320 B1 | 5/2003 | de Silva et al. | |
| 7,200,230 B2 * | 4/2007 | Knauft | 380/201 |

(Continued)

OTHER PUBLICATIONS

The State Intellectual Property Office of the People's Republic of China, Notification of the First Office Action, Jan. 6, 2014, all pages.

*Primary Examiner* — Esther B Henderson
(74) *Attorney, Agent, or Firm* — Fox Rothschild LLP (57) ABSTRACT

A method is provided for securely delivering identity data units over a communications network to a client device. The method includes receiving a selection from a customer identifying a final zipped package to be unpacked. The final zipped package is unpacked to obtain a common package and a digital signature file signed by an entity generating identity data requested by the customer. The digital signature in the digital signature file is verified and the common package is unpacked to obtain a plurality of outer packages and an encrypted symmetric key. The symmetric key is decrypted with a private key associated with the customer and each of the outer packages is decrypted with the symmetric key to obtain a plurality of identity data units.

23 Claims, 8 Drawing Sheets

(56) References Cited

U.S. PATENT DOCUMENTS

| | | |
|---|---|---|
| 7,624,132 B2 | 11/2009 | Lovvik et al. |
| 7,630,999 B2 | 12/2009 | De Vorchik et al. |
| 2001/0029581 A1 | 10/2001 | Knauft |
| 2004/0068658 A1* | 4/2004 | Arisaka et al. ............. 713/176 |
| 2005/0086196 A1* | 4/2005 | Peterson ..................... 707/1 |
| 2005/0086476 A1* | 4/2005 | Peterson ..................... 713/170 |
| 2006/0294366 A1 | 12/2006 | Nadalin et al. |
| 2007/0118735 A1 | 5/2007 | Cherrington et al. |
| 2009/0037729 A1 | 2/2009 | Smith et al. |
| 2009/0193511 A1 | 7/2009 | Noe et al. |
| 2010/0070755 A1 | 3/2010 | Himawan et al. |
| 2010/0082975 A1 | 4/2010 | Metke et al. |
| 2010/0115267 A1 | 5/2010 | Guo et al. |

* cited by examiner

| | PKIWORKS CLIENT | |
|---|---|---|
| 410 — FILE TO EXTRACT | C:\PKIWORKS-2893451466637.ZIP ▽ | BROWSE... |
| 420 — FILE EXTRACTION FOLDER | C:\ | BROWSE... |
| 425 — CLEAR PRIVATE KEY FOLDER | | BROWSE... |

BATCH FILE MANIFEST

430 —

| NAME | VALUE |
|---|---|
| USER NAME | ATHUYA027 |
| PRODUCT ID | 614 |
| REQUEST STARTED | 7/30/2000 11:17:47 AM |
| REQUEST COMPLETED | 7/30/2000 11:17:54 AM |
| CERTIFICATES | 50 |
| ERRORS | 0 |

440 — ☐ VALIDATE ALL PRIVATE KEYS (WILL SLOW DOWN PROCESS). IF UNCHECKED, THEN VALIDATE ☐1 PERCENT

STATUS
PROCESS:

START TIME:
END TIME:

[ PROCESS ]
[ CANCEL ]
[ CLOSE ]

LAYERED PROTECTION AND VALIDATION OF IDENTITY DATA DELIVERED ONLINE VIA MULTIPLE INTERMEDIATE CLIENTS

STATEMENT OF RELATED APPLICATIONS

This application claims the benefit of U.S. Provisional Patent Application Ser. No. 61/233,338, filed Aug. 12, 2009, which is incorporated herein by reference in its entirety.

BACKGROUND

Digital information has become extremely important in all aspects of commerce, education, government, entertainment and management. In many of these applications, the ability to ensure the privacy, integrity and authenticity of the information is critical. As a result, several digital security mechanisms have been developed to improve security.

One commonly used approach to digital security involves a certificate authority (CA) to issue a certificate to a certificate holder. The holder can then provide the certificate to a third party as an attestation by the CA that the holder who is named in the certificate is in fact the person, entity, machine, email address user, etc., that is set forth in the certificate. And that a public key in the certificate is, in fact, the holder's public key. People, devices, processes or other entities dealing with the certificate holder can rely upon the certificate in accordance with the CA's certification practice statement.

A certificate is typically created by the CA digitally signing, with its own private key, identifying information submitted to the CA along with the public key of the holder who seeks the certificate. A certificate usually has a limited period of validity, and can be revoked earlier in the event of compromise of the corresponding private key of the certificate holder, or other revocable event.

One standardized approach to today's digital security is referred to as the Public Key Infrastructure (PKI). PKI provides for use of digital certificates to authenticate the identity of a certificate holder, or to authenticate other information. Typically, a PKI certificate includes a collection of information to which a digital signature is attached. A CA that a community of certificate users trusts attaches its digital signature and issues the certificates to various users and/or devices within a system.

In the current market, companies and individuals who simply need PKI identity data may rely on a third party PKI service provider to provide PKI identity data and related services. In most cases, the PKI service provider needs to transfer PKI identity data over the network to its customers. Since identity data is being transferred over the network, the PKI service provider must present its customers means to ensure non-repudiation and correctness of the identity data. Accordingly, it would be desirable to ensure the privacy, authenticity and integrity of the identity data not only in the final environment but also at every intermediate stage of the delivery process.

SUMMARY

In accordance with one aspect of the invention, a method is provided for securely delivering identity data units over a communications network to a client device. The method includes the following steps:

a. generating a public key that is bound to a customer and a corresponding private key that is incorporated into an authentication token provided to the customer;

b. receiving a request from the customer for a plurality of identity data items that each includes at least one private key;

c. generating a unique symmetric key to be associated with the request;

d. generating a first of the identity data units, said first identity data unit including a first private key and its corresponding certificate;

e. packaging at least the first private key and an authenticator of the first private key into a first outer package;

f. encrypting the first outer package using the symmetric key;

g. repeating steps (d)-(f) for each remaining identity data unit included in the request to form a plurality of outer packages that includes the first outer package;

h. encrypting the symmetric key with a public key bound to the customer.

i. packaging each of the outer packages and the encrypted symmetric key into a common package;

j. packaging the common package and a digital signature file applied to the common package into a final package, said digital signature file being signed by an entity fulfilling the request from the customer; and k. delivering the final package to the client device over the communications network in response to customer request.

In accordance with another aspect of the invention, a method is provided for securely delivering identity data units over a communications network to a client device. The method includes receiving a selection from a customer identifying a final zipped package to be unpacked. The final zipped package is unpacked to obtain a common package and a digital signature file signed by an entity generating identity data requested by the customer. The digital signature in the digital signature file is verified and the common package is unpacked to obtain a plurality of outer packages and an encrypted symmetric key. The symmetric key is decrypted with a private key associated with the customer and each of the outer packages is decrypted with the symmetric key to obtain a plurality of identity data units.

DETAILED DESCRIPTION

The method, techniques and systems shown herein are applicable whenever a set of data needs to be delivered from one party to another with a guarantee of privacy, authenticity and integrity. For purposes of illustration only and with no loss of generally, the methods, techniques and systems described herein will be applied to identity data of the type that is generated by a PKI system. A single identity data unit as used herein refers to a private and public digital identity key pair. A digital certificate is generally associated with each identity data unit.

As detailed below, by configuring a set of data (e.g., a set of identity data units) with multiple layers of protection mechanisms and providing a client-based application that extracts and verifies the data, the service provider (a PKI service provider in the case of identity data) delivering the data will be able to securely and conveniently deliver the data to authorized intermediate customers or clients as well as end user customers or clients.

Figure 1:
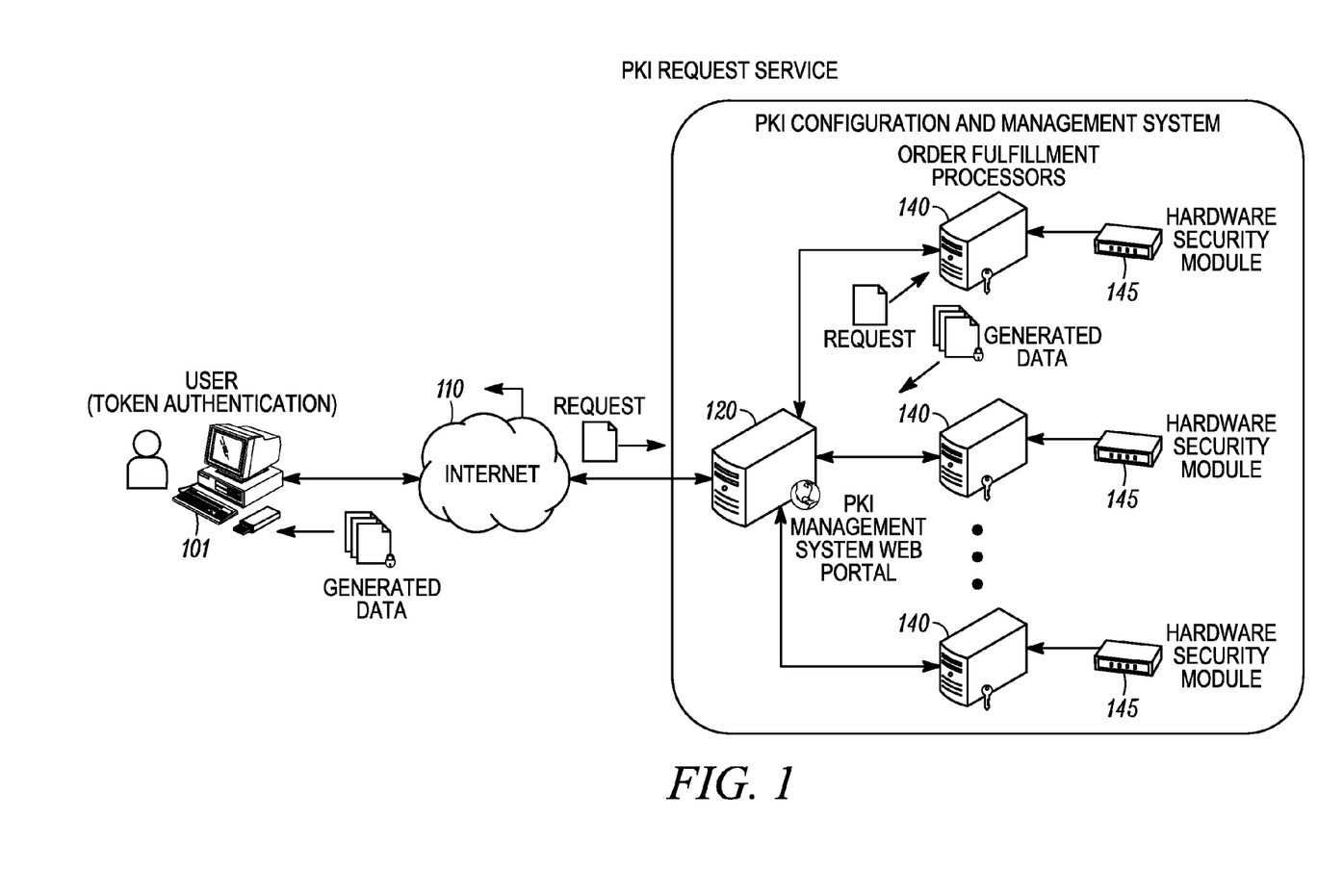
FIG. 1 shows a simplified schematic diagram of an illustrative PKI management system from which customers may obtain identity data units.

Turning now to the figures, FIG. 1 shows a simplified schematic diagram of an illustrative PKI management system from which customers may obtain identity data units. The system includes a customer 101 who communicates with the system over the Internet 110 or any other packet-based wide area network. In this example the customers access and interact with the system through one or more web portal servers 120, which provides a single front-end interface that is accessed by a client-based application such as a conventional web browser.

The PKI management system typically includes one or more physical server computers with one or more physical storage devices and databases as well as various processing engines. In particular, in the example shown in FIG. 1, the system includes order fulfillment processors 140 which generate digital certificates or other identity data requested for products. The order fulfillment processors may include, or have access to, hardware security modules (HSMs) 145 in which the CA's certificate signing private keys and secure data may be stored for use by the system. Of course, the PKI management system may include a number of other devices and databases not shown in FIG. 1. For instance, the PKI management system may contain a database of records. These records may pertain to issued digital certificates, original requests for new digital certificates or secure data, audit data, organization information, product configurations, user information, and other record types as necessary. The PKI service provider is the organization or company that implements and the Public Key Infrastructure and delivers PKI services to other entities such as organizations and companies.

The customer or user 101 uses a desktop client application to perform extraction and verification upon receiving requested results from the PKI Service Provider. This application, referring to herein as a package verification client, contains the PKI service provider's root signing key certificate. Before a customer initiates a PKI data request, the customer is first authenticated to ensure his or her identity. Next, the customer submits a request over the Internet 110 to the web portal server 120, which in turn forwards it on to the order fulfillment processors 140. The order fulfillment processors generate the requested data (Denoted by $Z_{final}$) which can be subsequently downloaded by the customer 101 via the web portal server 120 and the Internet 110

As noted above, prior to making identity data requests from the PKI service provider, a customer needs to be authenticated to ensure that the customer is who he or she claims to be. Authentication may be performed in a number of different ways. While a simple static password may be employed, it will generally be advantageous to employ a mechanism having a higher level of security. Examples of such mechanisms include hardware-based strong authentication tokens, smart cards, USB tokens, and authentication software. The methods and techniques described herein will be illustrated using USB tokens for authentication.

An authentication token such as a USB token is personalized by the PKI service provider and given to its customer. The token contains a set of unique RSA private key and certificate pair. Accordingly, if a USB token is employed, the customer first obtains the token from the PKI service provider through the following procedure. First, the customer contacts the PKI service provider regarding the service. The PKI service provider personalizes an authentication token with the customer's information and retains a copy of the authentication token's public key. The token key pair will be denoted by $T_{priv}$ for the private key and $T_{pub}$ for the public key. The PKI service provider physically delivers the physical authentication token and package verification client software to the customer.

The customer's authentication token may provide access to multiple identity data units that belong to distinct PKI infrastructures or projects. This authorizes the customer to access multiple infrastructures through a single physical token and authentication session for different types of identity data requests for the customer's products. The process of authentication and authorization can be distinct and separate from one another or they may be combined. If they remain separate, the customer's authentication certificate is only used to identify the customer. The authority of the customer can be stored as part of the customer's record within the system. The customer's certificate does not provide any information about the customer's authority and does not need to be replaced or updated in the event that the customer's authority changes. On the other hand, if the authentication and authorization processes are combined, an authentication certificate is generated specifying the customer's authority with respect to different infrastructures, with the customer's roles specified in data contained in the certificate. This latter approach may provide a stricter model of authorization and require a new certificate to be generated if a customer's account associations or authorized role changes. Also note, in the latter case the customer's authority with respect to each infrastructure may be separated by using multiple certificates and private keys.

The customer installs the package verification client on a personal computer or other processing machine which will be used for processing the identity data received from the PKI management system. The customer inserts the authentication token into the machine and is prompted to modify the token's default password. The customer also installs the package verification client on the machine.

Depending on the circumstances, customers may or may not be allowed to access the identity data (e.g., private keys) that they are downloading from the PKI system. For instance, in some cases a policy may be in place that requires clear identity data to be exposed only in the final target product. That is, the identity data is to remain protected (e.g., encrypted) until it is provisioned in the final target product, which has a suitable mechanism to access the identity data. In this way the identity data is only available inside the final target product in which the data is to be loaded. Accordingly, the package verification client software may give the customer the option to only allow clear identity data to be exposed in the final target product. If the customer selects this option, the customer needs to define for the PKI service provider a product specific key protection mechanism ($K_{product}$) to be used by the final target product. The customer has completed the registration process after the above procedure has been performed.

Figure 2A:
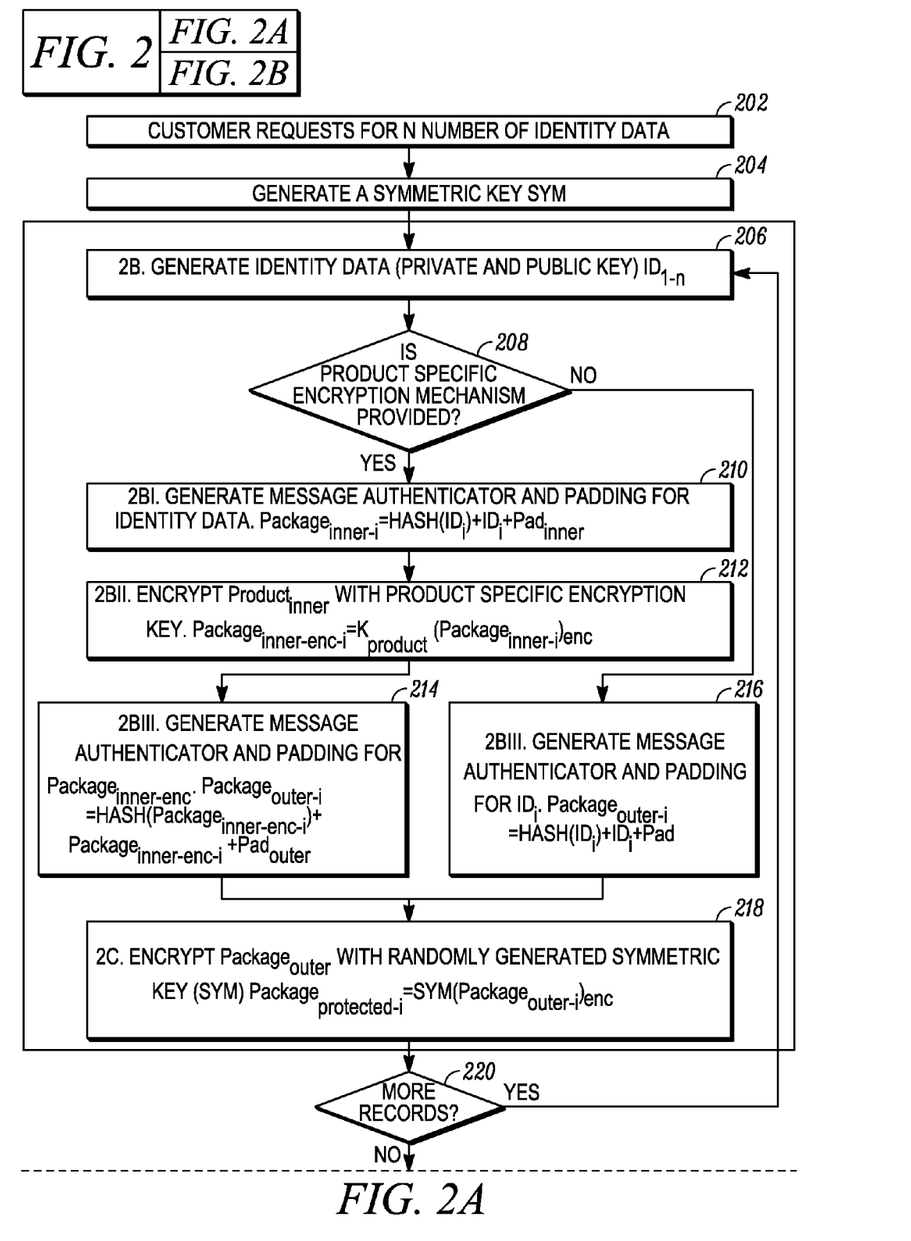
FIG. 2 is a flowchart illustrating one example of a method by which a customer requests identity data, which is generated and packaged by a PKI system, and downloaded by the customer in a secure manner.
Figure 2B:
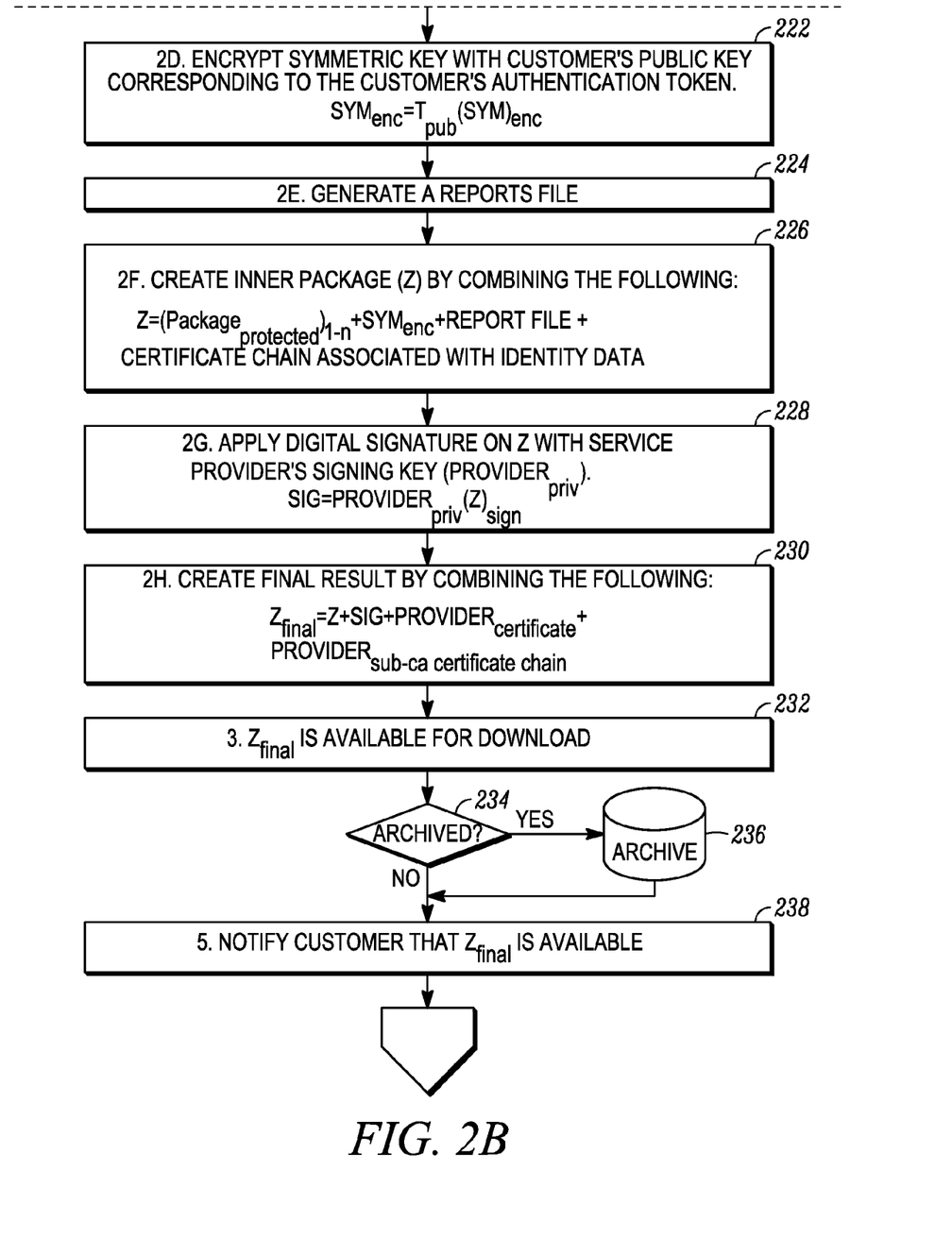

FIG. 2 is a flowchart illustrating one example of a method by which a customer requests identity data, which is generated and packaged by a PKI system, and downloaded by the customer in a secure manner. The method assumes that the client software has already been delivered and that the customer has been properly authenticated.

Figure 3:
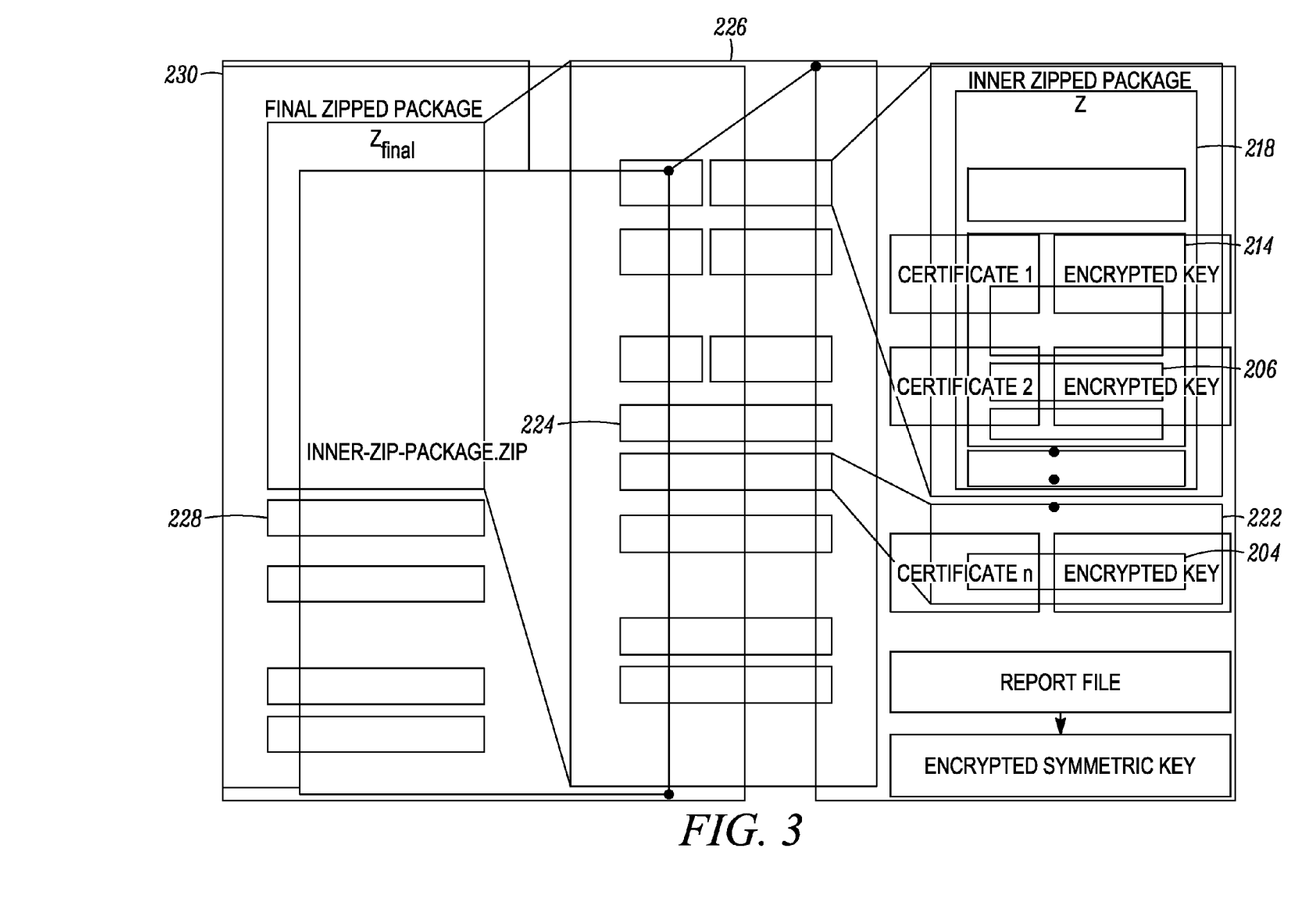
FIG. 3 is a visual depiction of the encryption and packaging process that accompanies the flowchart of FIG. 2.

The flowchart of FIG. 2 is accompanied by a visual depiction of the encryption and packaging process, which is presented in FIG. 3. Each item such as a key or package that is illustrated in FIG. 3 is denoted by the corresponding method step in FIG. 2 in which that item is formed.

The method begins in step 202 when a customer requests a number n of identity data units from the PKI service provider. The requests are made through the PKI service provider's website where the customer logs in using the authentication token.

The PKI service provider fulfills the request by performing the following steps. First, in step 204 the service provider randomly generates a symmetric key (denoted by SYM). This is used for encrypting the private portions of the identity data unit. Encryption is necessary to ensure the privacy of the identity data. The value of having a randomly generated symmetric key is to ensure that every customer request is encrypted by a different key so that not all requests are compromised if a symmetric key is compromised.

The first identity data unit is generated in step 206. The identity data units each include a private key and a certificate that contains the public key. The private keys are denoted herein by $ID_1$ to $ID_n$ and the public keys are included in the certificates and are therefore not separately indicated. Each private key for each identity data unit is encrypted in sequence and may be encrypted by multiple layers. An inner encryption layer is encryption performed directly on a unit of data. Additional encryption layers are encryptions applied to an already encrypted unit of data using a different key each time. The number of encryption layers that is employed depends on whether or not the clear identity data units are to be exposed only in the final target product. There is always at least one encryption layer intended to be removed by the customer who downloads the data ($Z_{final}$). In the case where the clear identity data is to be exposed only in the final target product, two encryption layers are employed. The inner layer encryption in this case can only be removed in the final target product. If the identity data units can be exposed before they are provisioned in the target product, then only one encryption layer is used for the private keys. The system determines at decision step 208 if the customer has chosen to allow clear identity data to be exposed only in the final target product. If so, then steps 210-214 are performed to encrypt the private key with a product-specific key, otherwise the method proceeds to step 216. Assuming that the clear identity data is only to be exposed in the final target product, a message authenticator is generated in step 210 based on the identity data. Specifically, a cryptographic hash of the private key $ID_i$ (subscript i denotes an index in $ID_{1...n}$) in the set of identity data units is generated, which is denoted $HASH(ID_i)$. A fixed message padding $Pad_{inner}$ may also be generated if a fixed message size is required. The message padding may also be used to perform an early determination of the data's integrity. An inner package ($Package_{inner}$) is formed, which includes the first private key, the hash of the private key and the inner message padding:

$$Package_{inner-i}=HASH(ID_i)+ID_i+Pad_{inner}$$

In step 212 the inner-package $Package_{inner}$ is encrypted with the product specific encryption key $K_{product}$ provided by the customer:

$$Package_{inner-enc-i}=K_{product}(Package_{inner-i})_{enc}.$$

In step 214 a message authenticator is generated for the encrypted inner-package, $HASH(Package_{Inner-enc-i})$. A fixed message padding, $Pad_{outer}$, is also generated for the encrypted inner-package. In this way an encrypted outer package $Package_{outer-i}$ is formed:

$$Package_{outer-i}=HASH(Package_{Inner-enc-i})+Package_{Inner-enc-i}+Pad_{outer}$$

If a product specific key has not been used (i.e. if the identity data units can be exposed before they are provisioned in the target product), then instead of performing steps 210, 212 and 214, the process proceeds to step 216. Since in this case no encrypted inner-package has been formed, the outer package is formed directly from the private key $ID_i$ by first generating a hash on the private key $ID_i$, forming $HASH(ID_i)$. The outer package $Package_{outer-i}$ that is now formed is defined as $$Package_{outer-i}=HASH(ID_i)+ID_i+Pad_{outer}$$

Next, in step 218, the outer-package, whether generated in step 214 or 216, is encrypted with the symmetric key that the system generated in step 204.

$$Package_{protected-i}=SYM(Package_{outer-i})_{enc}$$

The contents of this package can be seen in the right-most portion of FIG. 3.

At this point the encryption process for the first private key is complete. At decision step 220 the system determines if more identity data units or records are included in the customer's request in step 202. If so, then the process returns to step 206 to form as many additional encrypted private keys as required, which in this example is n encrypted private keys.

Once the encrypted outer packages have been generated for all the requested number of identity data items, the process proceeds to step 222. In this step the symmetric key with which the outer package is protected is itself encrypted for delivery to the customer, who will subsequently use it to decrypt the outer packages for each private key. In step 222 the symmetric key is encrypted with the customer's public key ($T_{pub}$) associated with the customer's authentication token. That is, $$SYM_{enc}=T_{pub}(SYM)_{enc}$$

The corresponding private key ($T_{priv}$), of course, is stored inside the authentication token, which, as noted above, was created when the customer first registered. In this way only the customer with the correct authentication token will be able to decrypt the symmetric key and, in turn, will be the only one able to decrypt the encrypted portions of the identity data. While in principle the outer-package could be encrypted by the customer's public key directly, thereby avoiding the need for the symmetric key, such an approach would be computationally inefficient because public key encryption algorithms are slow in comparison to symmetric key encryption algorithms. When the customer requests a large number of identity data units, the number of private keys that would need to be encrypted make the use of public key encryption impractical, thereby encouraging the use of a symmetric key and not the customer's public key.

Next, in step 224 a report file is generated. The report file contains information such as how many key pairs were generated, how many failed to generate, the date that the key pairs were generated and so on.

The n identity data units, that have been generated, next need to be packaged in a convenient form so that they can be sent to the customer in a single file. One way to package them in this manner is with the use of a compression/archiving utility such as a zipping utility, for example. This package, referred to as an inner zipped package is formed in step 226 and is shown in the center-most portion of FIG. 3. As shown, the inner zipped package Z includes the following items:
  i. Encrypted private keys produced in step 218 ($(Package_{protected})_{1,n}$) along with their corresponding certificates.
  ii. Encrypted symmetric key produced in step 222 ($SYM_{enc}$)
  iii. Report file produced in step 224.
  iv. Certificate chain associated with the identity data produced in step 218 (note that all the certificates that have been generated have a common certificate chain, represented by the last three items in the inner zipped package shown in FIG. 3).

Thus, the inner zipped package Z can be represented as follows:

$$Z = (Package_{protected})_{1,n} + SYM_{enc} + \text{Report file} + \text{Certificate chain associated with identity data } ID_{1,n}$$

The inner zipped package is placed in a final zipped package, shown in the left-most portion of FIG. 3. The final zipped package is formed by first applying a digital signature over the inner zipped package in step 228 using the PKI Service Provider's signing key ($PROVIDER_{priv}$). A digital signature is applied to ensure authenticity of the data. The digital signature verification will fail if the data has been altered (discussed below in the verification process). The output of this step is a signature file (SIG):

$$SIG = PROVIDER_{priv}(Z)_{sign}$$

The final zipped package is created in step 230 by combining the following components using a compression/archiving utility such as a zipping utility, for example:
  i. The inner zipped package produced in step 226.
  ii. The digital signature file produced in step 228.
  iii. The certificate corresponding to the PKI Service Provider's signing key.
  iv. The CA certificate chain of the PKI service provider's signing key.

Thus, this final zipped package $Z_{final}$ may be represented as follows:

$$Z_{final} = Z + SIG + PROVIDER_{certificate} + PROVIDER_{sub\text{-}ca\ certificate\ chain}$$

The final zipped package is now complete and in step 232 is made available for downloading by the customer through the PKI service provider's website. In addition, the final zipped package could be archived by the PKI service provider depending on the customer's policies, which are determined at decision step 234. If the customer does want the package archived, then the service provider does so at step 236, otherwise the service provider simply notifies the customer that the final zipped package $Z_{final}$ is available by sending a notification email to the customer in step 238.

Figure 4A:
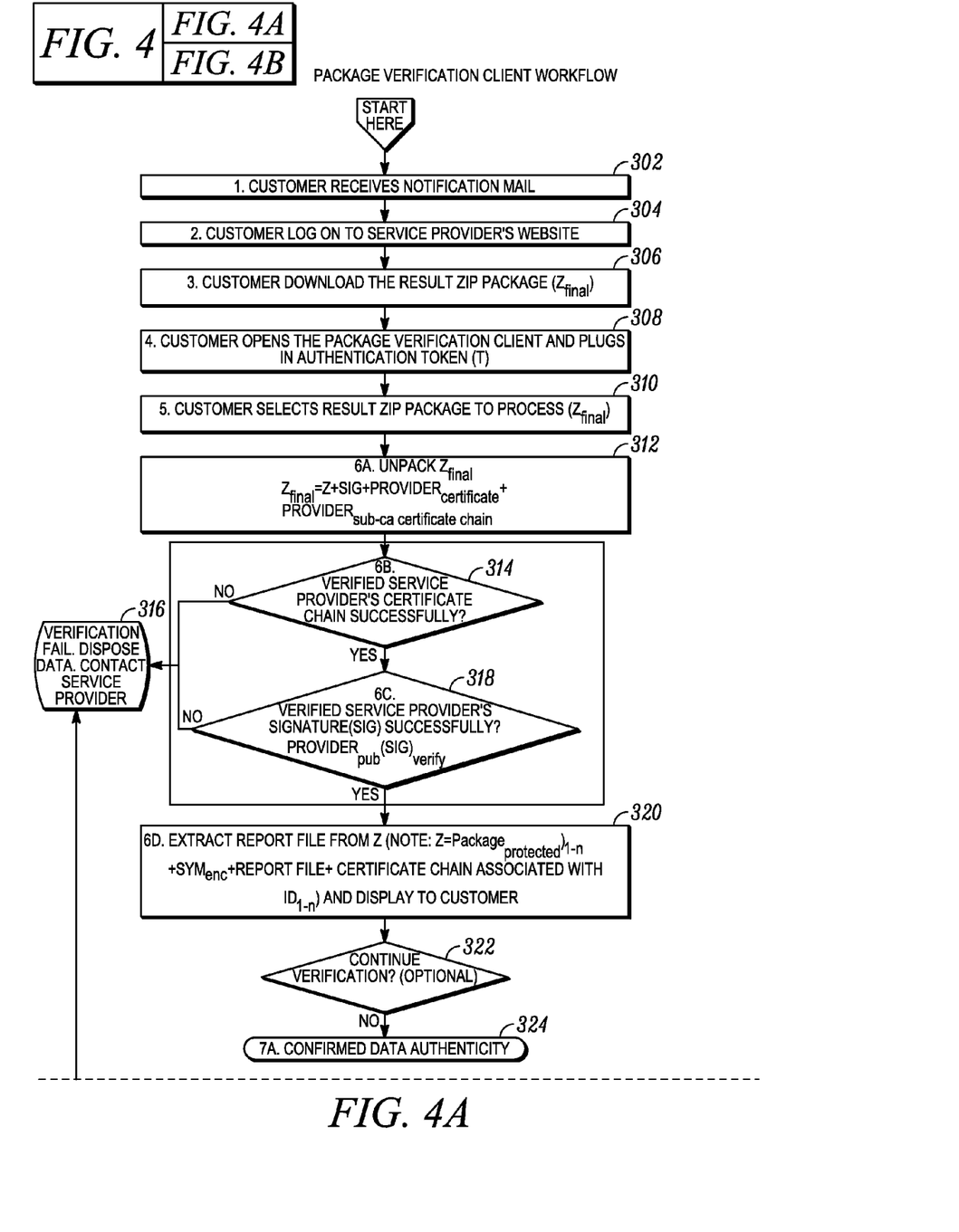
FIG. 4 is a flowchart showing one example of a process that may be performed by the customer in order to obtain and verify the identity data units in the final zipped package.
Figure 4B:
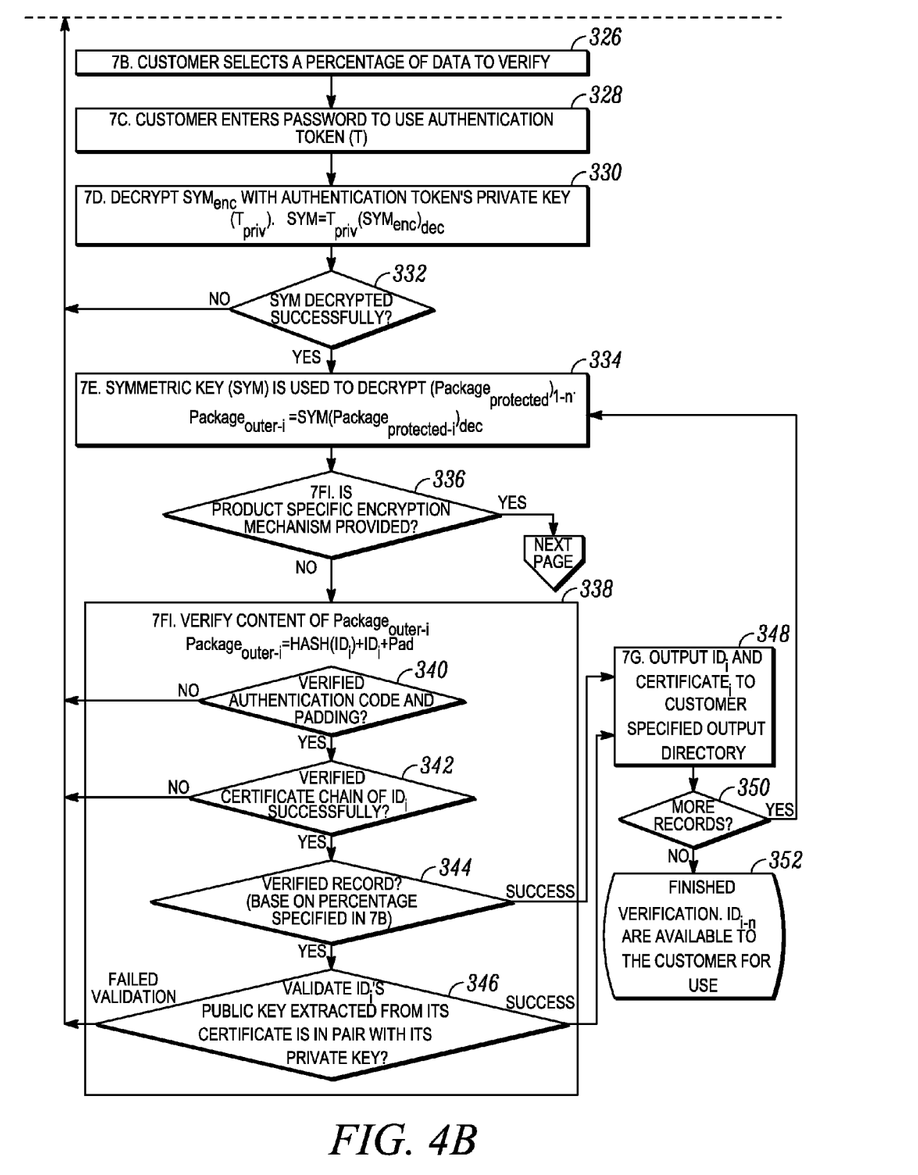

FIG. 4 is a flowchart showing one example of a process that may be performed by the customer in order to obtain and verify the identity data units in the final zipped package.

First, in step 302, the customer receives the notification email from the PKI service provider regarding a completed request. The customer logs onto the PKI Service Provider's website using the authentication token in step 304, after which the customer downloads the final zipped package $Z_{final}$ from the website in step 306. Next, in step 308 the customer opens the previously-installed package verification client using the authentication token.

Figure 5:
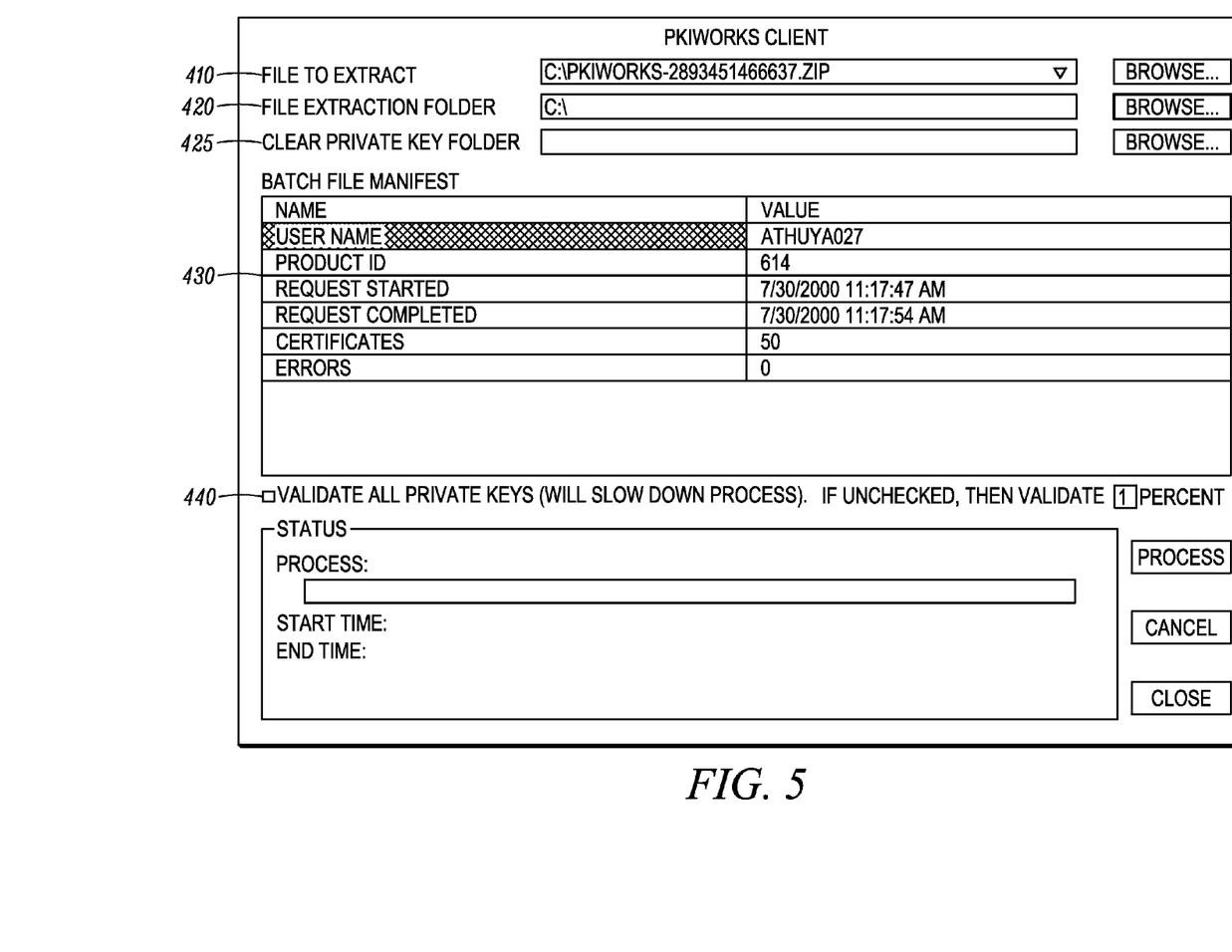
FIG. 5 shows one example of a graphical user interface (GUI) that may be presented to the customer by the package verification client.

One example of a graphical user interface (GUI) that may be presented to the customer by the package verification client is shown in FIG. 5. As shown, the GUI presents a number of different fields that that the customer needs to populate, in some cases by making the appropriate selection from a pull-down menu. For instance, field 410 allows the customer to select the final zipped package that is to be downloaded. Field 420 allows the customer to select the local folder to which to which the package is to be downloaded. Field 425 allows the customer to choose a different secure location where clear private key data can be saved since the field 420 may not always be a secure location. The GUI also includes a batch file manifest 430 that displays the information included in the report that accompanies the final zipped package, thereby providing the customer with a summary of the identity data generation process. The GUI also includes a field 440 that allows the customer to optionally validate the private keys that have been generated. This option will be discussed in more detail below.

The customer uses the GUI in step 310 to populate its various fields in order to select the appropriate file that is to be processed, which in this case is the final zipped package $Z_{final}$.

In response to the customer's selection, the package verification client will unpack (e.g., unzip) the final zipped package in step 312 to provide the final zipped package. This makes available the contents of the inner final package $Z_{final}$ that was formed in step 230 of the generation process, where, once again, $Z_{final}$ is:

$$Z_{final} = Z + SIG + PROVIDER_{certificate} + PROVIDER_{sub\text{-}ca\ certificate\ chain}$$

The package verification client then verifies the PKI service provider's signing key certificate chain in decision step 314. The root certificate is generally not included in the package that is downloaded, but instead may have been previously embedded in the package verification client. In this way potential attackers are prevented from re-signing the package with another key pair and replacing the signing key certificate. If the signing key certificate is replaced, the package will fail the certificate chain validation.

If the certificate chain verifies successfully, the package verification client continues to verify in step 318 the digital signature file (denoted by SIG) produced in step 226 of the identity data generation process by using the signing key certificate($PROVIDER_{pub}$). If the digital signature file verification fails in step 318, the package verification client will notify the customer in step 316 that the package is tampered and should be disposed. If on the other hand the digital signature file is successfully verified in step 318, the package verification client in step 320 displays the report file that is included in the inner zipped package Z. The report is shown in field 430 of the GUI of FIG. 5. While this last step is not required, it provides a convenient "at-a-glance" view of the inner package before the package is actually unzipped and verified (which may take a long time).

At this point, the identity data has still not yet been revealed. However, the customer can be assured that the data is from the intended PKI service provider and that the data has not been tampered with.

Now, at decision step 322, the customer may choose not to continue the process if the identity data is not needed immediately. In this case the identity data will remain encrypted and zipped and the process terminates at step 324. At this point, the data's authenticity has been confirmed. If, on the other hand, the customer chooses to continue to unpack the data at decision step 322, the GUI in FIG. 5 (see field 440) presents the customer with the opportunity to choose a percentage of the overall number of identity data units to check for key pair correctness. The validation process is performed sequentially on each decrypted private key and its corresponding certificate as shown in step 334. The verification process also depends on whether the customer has chosen to use a product specific protection mechanism during the initial registration and authentication process.

While it is ideally desirable to verify a 100% of the identity data that has been generated in order to ensure its correctness, the customer may wish to only verify a smaller percentage because of the slowness of the verification process.

The customer selects the desired percentage of data to be verified in step 326 (GUI example shown in 440). The customer then inserts the authentication token into the client device and enters the corresponding password to unlock the token in step 328. The package verification client uses the authentication token, which contains the private key($T_{priv}$), to decrypt the encrypted symmetric key ($SYM_{enc}$, produced in step 222 of the identity data generation process) in step 330.

$$SYM = T_{priv}(SYM_{enc})_{dec}$$

If the symmetric key fails to decrypt, then at decision step 332 the private identity data cannot be decrypted or used and the process terminates at step 316. This is to prevent the identity data to be used by unauthorized parties.

If the symmetric key does correctly decrypt, it is then used in step 334 to decrypt the first outer package (i.e., the package$_{protected-i}$, produced in 218 of the identity data generation process). This step will need to be sequentially is repeated for each identity data unit generated in step 218 of the identity generation process to obtain:

$$Package_{outer-i} = SYM(Package_{protected-i})_{dec}$$

If the customer has chosen not to use a product specific protection mechanism, then at decision step 336 the process proceeds to step 338. The data validation process in step 338 verifies the contents of the outer package. In step 340 the authentication code and padding in the outer package is verified. If this is successful, the method proceeds to step 342 in which the certification chain for the private key is verified Next, at decision step 344, the package verification client will randomly select an appropriate subset of all the identity data units to verify based on the percentage that has been provided by the customer in steps 326 and 440. If the identity data unit is not selected for verification, the process proceeds to step 348. The selection percentage of identity data units to be verified can alternatively be applied in the steps beginning at 340 to further improve efficiency. If the identity data unit is selected for verification, then step 346 is performed to verify the correctness of the public/private key pair. This verification process is performed by extracting the public key from the certificate accompanying the first outer package, which is then used to encrypt a dummy message. The encrypted dummy message is then decrypted using the private key. If the process is successful, the key pair is intact and the method proceeds to step 348. If any of the verification steps 340, 342, and 346 fails, the process terminates at step 316.

Assuming the verification steps 340, 342, and 346 were successful, the first inner package (including the first private key and its associated certificate) is output at step 348. If at decision step 350 the system determines that there are more identity data items present, the process returns to step 336 to decrypt the next outer package. This verification loop from step 336 through step 350 continues until all the outer packages have been decrypted to obtain the inner package. At this point the private keys and their corresponding certificates are in the clear and located on the client device so that they are available for customer use in step 352.

Returning to step 336, if the customer has chosen to use a product specific protection mechanism, the process proceeds to step 354 (see FIG. 6) where the contents of the outer package is verified. Next, at decision step 358 in which the authentication code and padding in the first outer package is verified. If this is successful, the method proceeds to step 360 in which the certification chain for the first private key is verified. If any of the verification steps 358 and 360 fails, the process terminates at step 316. On the other hand, if they are successful, the first encrypted inner package is output at step 362. If at decision step 364 the system determines that there are more identity data items present, the process returns to step 336 to decrypt the next outer package. This verification loop from step 336 through step 362 continues until all the outer packages have been decrypted.

Figure 6:
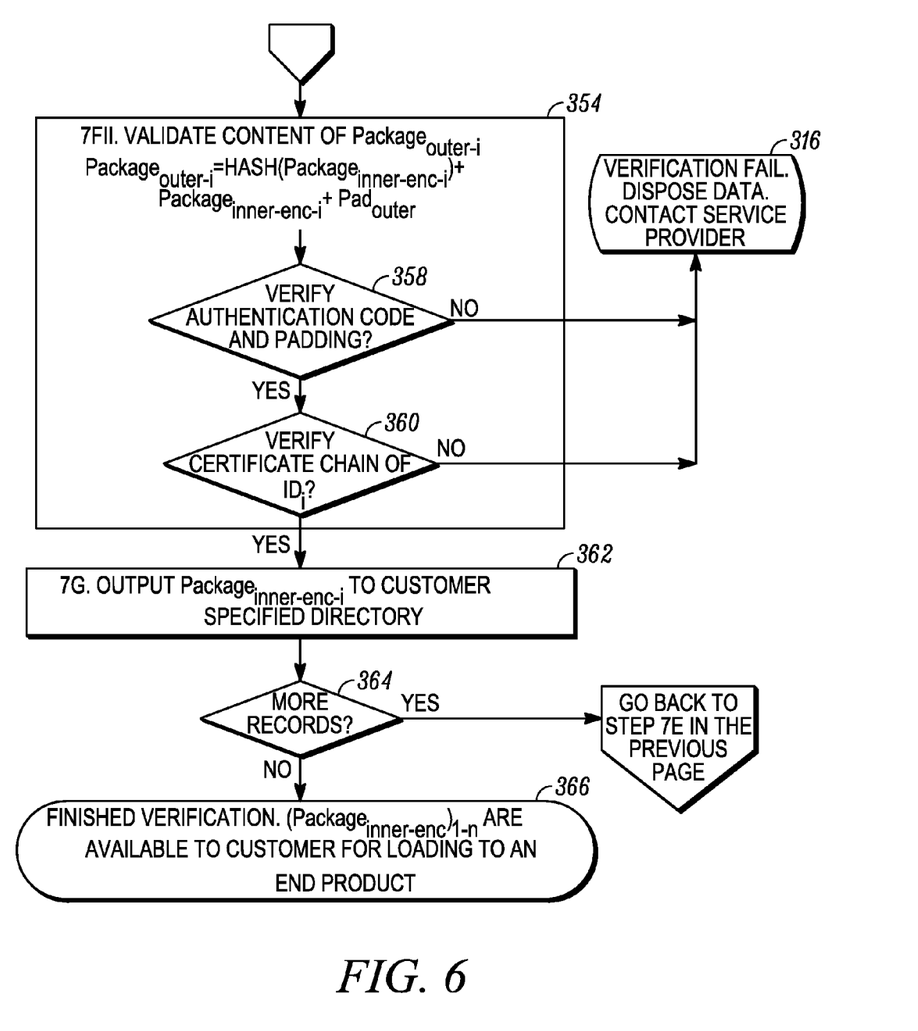
FIG. 6 is a continuation of the flowchart shown in FIG. 4.

At this point all the encrypted inner packages are available and located on the client device so that they are available for customer use in step 366. At some subsequent time the customer can load the encrypted inner packages into their respective target devices. The target devices can then decrypt the inner package to obtain the private key and its accompanying certificate using the target device's specific protection mechanism. Since this protection mechanism is specific to this particular product, the identity data can be used only in the target product. The target devices can also verify the decryption process by checking the message authenticator and checking the padding included in the inner-package.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. At least one non-transitory computer-readable medium encoded with instructions which, when executed by a processor, performs a method including:
   receiving a selection from a customer identifying a final zipped package to be unpacked;

unpacking the final zipped package to obtain a common package and a digital signature file signed by an entity generating identity data requested by the customer;

verifying the digital signature in the digital signature file;

unpacking the common package to obtain a plurality of outer packages and an encrypted symmetric key;

receiving a request from the customer to verify data contained in a customer selected subset of the outer packages;

in response to the request, verifying the data in the customer selected subset of the outer packages;

decrypting the symmetric key with a private key associated with the customer; and decrypting each of the outer packages with the symmetric key to obtain a plurality of identity data units.

2. The computer-readable medium of claim 1 wherein unpacking the common package includes unpacking a report file that includes information relating to formation of the identity data units.

3. The computer-readable medium of claim 1 further comprising displaying to the customer a batch file manifest that presents information included in the report file before the outer packages are decrypted.

4. The computer-readable medium of claim 1, wherein unpacking the final zipped package second certificate chain associated with the entity generating identity data requested by the customer, further comprising verifying the second certificate chain and the digital signature and only unpacking the common package if the second certificate chain is verified.

5. The computer-readable medium of claim 1 further comprising opening a client application that extracts the identity data units from the final zipped package upon customer request only after the customer is authenticated.

6. The computer-readable medium of claim 5 wherein the customer is authenticated using an authentication token provided by the entity generating identity data.

7. The computer-readable medium of claim 1 wherein decrypting each of the outer packages further includes decrypting each of the outer packages to obtain the plurality of identity data units, an authenticator associated with each of the identity data units and padding associated with each of the identity data units.

8. The computer-readable medium of claim 7 wherein verifying the data contained in a customer selected subset of the outer packages includes verifying content in the outer package and verifying the authenticator and padding included in the outer package as well as the certification chain associated with the identity data units included in the outer package.

9. The computer-readable medium of claim 1 further comprising receiving a request from the customer requesting a private key associated with each of the identity data units to be stored in a secure location and a certificate associated with each of the identity data units to be stored in a different location.

10. The computer-readable medium of claim 1 further comprising:

validating a private key associated with each of the identity data units against its corresponding certificate by using the private key to encrypt test data;

decrypting the encrypted test data with a public key obtained from the corresponding certificate to obtain decrypted test data; and ensuring that the decrypted test data result matches the test data.

11. The computer-readable medium of claim 10 wherein validation of the private key against its corresponding certificate is performed for the customer selected subset of the outer packages and in response to a customer request to verify data in the customer selected subset of the outer packages.

12. At least one non-transitory computer-readable medium encoded with instructions which, when executed by a processor, performs a method including:

receiving a selection from a customer identifying a final zipped package to be unpacked;

unpacking the final zipped package to obtain a common package and a digital signature file signed by an entity generating identity data requested by the customer;

unpacking the common package to obtain a plurality of outer packages and an encrypted symmetric key;

receiving a request from the customer to verify data contained in a customer selected subset of the outer packages;

in response to the request, verifying the data in the customer selected subset of the outer packages;

decrypting the symmetric key with a private key associated with the customer; and decrypting each of the outer packages with the symmetric key to obtain a plurality of encrypted inner packages each of which are to be loaded into product devices for subsequent decryption using a product specific key.

13. The computer-readable medium of claim 12 wherein decrypting each of the outer packages further includes decrypting each of the outer packages to obtain the plurality of encrypted inner package, an authenticator associated with each of the encrypted inner packages and padding associated with each of the encrypted inner packages.

14. The computer-readable medium of claim 12 wherein verifying the data contained in a customer selected subset of the outer packages includes verifying content in the outer package and verifying the authenticator and padding included in the outer package as well as the certification chain associated with the identity data units included in the outer package.

15. At least one non-transitory computer-readable medium encoded with instructions which, when executed by a processor, performs a method including:

unpacking a final package formed by combining a common package and a digital signature file signed by an entity generating identity data requested by the customer;

unpacking the common package, the common package formed by combining a plurality of outer packages and an encrypted symmetric key;

receiving a request from the customer to verify data contained in a customer selected subset of the outer packages;

in response to the request, verifying the data in the customer selected subset of the outer packages;

decrypting the symmetric key with a private key associated with the customer; and decrypting each of the outer packages with the symmetric key to obtain a plurality of identity data units.

16. The computer-readable medium of claim 15, wherein each of the plurality of identity data units includes a private key and a certificate of a public key corresponding to the private key.

17. The computer-readable medium of claim 16, wherein each of the plurality of identity data units is encrypted with an inner encryption layer performed directly on the identity data unit.

18. The computer-readable medium of claim 17, wherein the inner encryption layer is performed with a product-specific key, and wherein each of the plurality of identity data units is further encrypted with a second encryption layer.

19. The computer-readable medium of claim 17, wherein unpacking the common package includes unpacking a report file that includes information relating to formation of the identity data units.

20. The computer-readable medium of claim 19, further comprising presenting information included in the report file before the decrypting the outer packages.

21. The computer-readable medium of claim 15, further comprising opening a client application that extracts the identity data units from the final package upon customer request only after the customer is authenticated.

22. The computer-readable medium of claim 1, wherein each of the plurality of identity data units includes a private key and a certificate of a public key corresponding to the private key.

23. The computer-readable medium of claim 12, wherein the final zipped package is formed by combining the common package and the digital signature file, and the common package is formed by combining the plurality of outer packages and the encrypted symmetric key.

* * * * *